(12) United States Patent
Roy et al.

(10) Patent No.: US 8,948,806 B2
(45) Date of Patent: Feb. 3, 2015

(54) LOSS DIFFERENTIATION BASED MANAGEMENT OF WIRELESS NETWORKS

(75) Inventors: Sumit Roy, Bothell, WA (US); Hui Ma, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 807 days.

(21) Appl. No.: 12/497,242

(22) Filed: Jul. 2, 2009

(65) Prior Publication Data

US 2011/0003612 A1    Jan. 6, 2011

(51) Int. Cl.
*H04B 7/00* (2006.01)
*H04W 52/48* (2009.01)
*H04W 74/08* (2009.01)

(52) U.S. Cl.
CPC .......... *H04W 52/48* (2013.01); *H04W 74/0808* (2013.01)
USPC ....................................... 455/522; 455/67.11

(58) Field of Classification Search
CPC ..... H04W 24/00; H04W 28/18; H04W 88/02; H04W 28/22; H04W 52/20; H04W 52/243; H04W 72/12; H04W 84/12; H04W 52/0245; H04W 52/04; H04W 52/24; H04L 47/14; H04L 47/626; H04L 1/0025; H04L 1/0061
USPC ............. 455/434, 226.1, 515, 522, 67.11, 69, 455/437, 502, 406, 501; 370/333, 318, 254, 370/445, 329, 400, 312
See application file for complete search history.

(56) References Cited

U.S. PATENT DOCUMENTS

| | | | |
|---|---|---|---|
| 6,445,923 B1* | 9/2002 | Fujimori et al. | 455/434 |
| 2005/0070317 A1* | 3/2005 | Liu | 455/502 |
| 2005/0164730 A1* | 7/2005 | Chen et al. | 455/522 |
| 2005/0180359 A1* | 8/2005 | Seals et al. | 370/333 |
| 2006/0056382 A1* | 3/2006 | Yamada et al. | 370/349 |
| 2007/0242621 A1* | 10/2007 | Nandagopalan et al. | 370/254 |
| 2007/0286122 A1* | 12/2007 | Fonseca | 370/329 |
| 2008/0125160 A1* | 5/2008 | Zhu | 455/522 |
| 2008/0280615 A1* | 11/2008 | Vinayakray-Jani | 455/437 |
| 2009/0005092 A1* | 1/2009 | Li et al. | 455/501 |
| 2009/0103501 A1* | 4/2009 | Farrag et al. | 370/337 |
| 2009/0124233 A1* | 5/2009 | Morris | 455/406 |
| 2009/0310516 A1* | 12/2009 | Goel et al. | 370/254 |

OTHER PUBLICATIONS

Hui Ma, Sumit Roy, Jing Zhu, PHY/MAC Adaptation Approaches for Dense Wireless LAN MESH, COMSWARE 12 2008, Jan. 6-10, 2008, pp. 204-207, Bangalore, India.*

Jing Zhu, Xingang Guo, L. Lily Yang, W. Steven Conner, Sumit Roy, Mousumi M. Hazra, Adapting physical carrier sensing to maximize spatial reuse in 802.11 mesh networks, Wireless Communications and Mobile Computing, 2004, pp. 933-946.*

CSMA Self-Adaptation based on Interference Differentiation, Jing Zhu, Xingang Guo, Sumit Roy, and Konstantina Papagiannak, pp. 4946-4951.*

Contention Window and Transmission Opportunity Adaptation for Dense IEEE 802.11 WLAN Based on Loss Differentiation, by Hui Ma, Sumit Roy, 2008.*

(Continued)

*Primary Examiner* — Golam Sorowar
(74) *Attorney, Agent, or Firm* — Brundidge & Stanger, P.C.

(57) ABSTRACT

Implementations of loss differentiation based management of wireless networks are disclosed.

26 Claims, 9 Drawing Sheets

(56) References Cited

OTHER PUBLICATIONS

Kim, M.S., et al., "Adaptive Window Mechanism for the IEEE 802.11 MAC in Wireless Ad Hoc Networks", ICOIN 2005, LNCS 3391, 2005.

Bruno, R., et al., "A Novel Fair Medium Access Control for 802.11-based Multi-Hop Ad hoc Networks," Proc. 14th IEEE Workshop on Local and Metropolitan Area Networks, Sep. 2005.

Razafindralambo, T., et al., "Increasing Fairness and Efficiency using the MadMac Protocol in Ad Hoc Networks," in IFIP Networking, May 2006, pp. 403-414.

Wu, S, et al., "Intelligent Medium Access for Mobile Ad Hoc Networks with Busy Tones and Power Control," IEEE Journal on Selected Areas in Communications, 2000, pp. 1647-1657, vol. 18, No. 9.

Monks, J., et al., "A Power Controlled Multiple Access Protocol for Wireless Packet Networks," in Proceedings of the 20th Annual Joint Conference of the IEEE Computer and Communications Societies, Apr. 2001, pp. 219-228.

Muqattash, A., et al., "Power Controlled Dual Channel (PCDC) Medium Access Protocol for Wireless Ad Hoc Networks," in Proceedings of the 22nd Annual Joint Conference of the IEEE Computer and Communications Societies, 2003, pp. 470-480.

Chen, J., et. al., "PASA: Power Adaptation for Starvation Avoidance to Deliver Wireless Multimedia," IEEE JSAC, Dec. 2003, vol. 21, No. 10.

Muqattash, A., et al., "POWMAC: A Single-Channel Power-Control Protocol for Throughput Enhancement in Wireless Ad Hoc Networks", IEEE JSAC, May 2005, vol. 23, No. 5.

Ma, H., et al., "On Loss Differentiation for CSMA-based Dense Wireless Network," IEEE Communications Letters, Nov. 2007, vol. 11, No. 11.

Yang, Y., et al., "Modeling of Physical Carrier Sense in Multi-hop Wireless Networks and Its Use in Joint Power Control and Carrier Sense Adjustment," IEEE INFOCOM, Miniconference 2007.

IEEE 802.11—IEEE Standard for Information technology—Telecommunications and information exchange between systems—Local and metropolitan area networks—Specific requirements, Part 11: Wireless LAN Medium Access Control (MAC) and Physical Layer (PHY) Specifications, New York (USA), 2007.

Hui Ma, Jing Zhu, Sumit Roy, on Loss Differentiation for CSMA-based Dense Wireless Network, Apr. 2007, UWEE Technical Report, No. UWEETR-2007-0002.

Jing Zhu, Benjamin Metzler, Xingang Guo, York Liu, Adaptive CSMA for Scalable Network Capacity in High-Density WLAN: a Hardware Prototyping Approach, 25th IEEE International Conference on Computer Communications, Apr. 23-29, 2006, pp. 1-10, Barcelona, Spain.

Giuseppe Bianchi, Performance Analysis of the IEEE 802.11 Distributed Coordination Function, IEEE Journal on Selected Areas in Communication, Mar. 2000, vol. 18 Is. 3, pp. 535-547.

Aditya Akella, Glenn Judd, Srinivasan Seshan, Peter Steenkiste, Self-Management in Chaotic Wireless Deployments, International Conference on Mobile Computing and Networking, Aug. 28-Sep. 2, 2005, Cologne, Germany, pp. 185-199.

Jason A. Fuemmeler, Nitin H. Vaidya, Venugopal V. Veeravalli, Selecting Transmit Powers and Carrier Sense Thresholds in CSMA Protocols for Wireless Ad Hoc Networks, 2nd Annual International workshop on Wireless Internet, 2006, Boston, MA, USA.

Tae-Suk Kim, Hyuk Lim, Jennifer C. Hou, Improving Spatial Reuse through Tuning Transmit Power, Carrier Sense Threshold, and Data Rate in Multihop Wireless Networks, 12th Annual International Conference on Mobile Computing and Networking, Sep. 24-29, 2006, Los Angeles, CA, USA,, pp. 366-377.

Yong Yang, Jennifer C. Hou, Lu-Chuan Kung, Modeling of Physical Carrier Sense in Multi-hop Wireless Networks and Its Use in Joint Power Control and Carrier Sense Adjustment, Ideals, Aug. 2008.

Vivek P.Mhatre, Konstantina Papagiannaki, Francois Baccelli, Interference Mitigation through Power Control in High Density 802.11 WLANs, 26th IEEE International Conference on Computer Communication, May 6-12, 2007, pp. 535-543, Anchorage, AK, USA.

Hui Ma, Jing Zhu, Sumit Roy, Soo Young Shin, Joint transmit power and physical carrier sensing adaptation based on loss differentiation for high density IEEE 802.11 WLAN, Elsevier Computer Networks, Jun. 2008, vol. 52 Is. 9, pp. 1703-1720.

Hui Ma, Sumit Roy, Contention Window and Transmission Opportunity Adaptation for Dense IEEE 802.11 WLAN Based on Loss Differentation, IEEE International Conference on Communications, May 19-23, 2008, Beijing, China.

Hui Ma, Sumit Roy, Jing Zhu, PHY/MAC Adaptation Approaches for Dense Wireless LAN MESH, COMSWARE 2008, Jan. 6-10, 2008, pp. 204-207, Bangalore, India.

Hui Ma, Soo Young Shin, Sumit Roy, Optimizing Throughput with Carrier Sensing Adaptation for IEEE 802.11 Mesh Networks Based on Loss Differentiation, Proceedings of IEEE International Conference on Communications 2007, Jun. 24-28, 2007,pp. 4967-4972, Glasgow, Scotland.

* cited by examiner

700 A computer program product.

702 A signal bearing medium.

704 at least one of one or more instructions for modifying a transmission power level at a wireless node in response to first and second packet error rates;

one or more instructions for modifying a carrier sensing threshold at the wireless node in response to first and second packet error rates;

one or more instructions for receiving first and second packet error rates at a wireless node;

one or more instructions for generating first and second packet error rates at a wireless node;

one or more instructions for decreasing the carrier sensing threshold if the first packet error rate exceeds a first threshold value;

one or more instructions for increasing the carrier sensing threshold if the first packet error rate is less than or equal to the first threshold value and if the second packet error rate is less than or equal to a second threshold value;

one or more instructions for increasing the transmission power level if the second packet error rate exceeds the second threshold value;

one or more instructions for decreasing the transmission power level if the first packet error rate is less than or equal to the first threshold value or if the second packet error rate is less than or equal to the second threshold value;

one or more instructions for modifying a contention window ratio at a wireless node in response to a third packet error rate;

one or more instructions for increasing the contention window ratio if the third packet error rate exceeds an upper threshold value;

one or more instructions for decreasing the contention window ratio if a lower threshold value exceeds the third packet error rate;

one or more instructions for determining contention window ratios associated with one or more neighboring wireless nodes;

one or more instructions for comparing a frame transmission rate to a threshold value;

one or more instructions for modifying a transmission opportunity (TXOP) limit at a wireless node in response to the comparison;

one or more instructions for decreasing the frame transmission rate until the threshold value equals or exceeds the frame transmission rate; or one or more instructions for increasing the frame transmission rate until the frame transmission rate equals or exceeds the threshold value.

| 706 a computer-readable medium. | 708 a recordable medium. | 710 a communications medium. |

LOSS DIFFERENTIATION BASED MANAGEMENT OF WIRELESS NETWORKS

BACKGROUND

In wireless networks such as Wireless Local Area Networks (WLANs), several link or physical layer (PHY) parameters and protocol layer or Media Access Control (MAC) parameters present opportunities for more efficient network management. Typically, such parameters are independently adapted without considering their interaction with each other. Further, some aspects of current wireless network management protocol stack implementations are based on assumptions that can limit network effectiveness in a high-density environment. For example, in typical high-density (HD) WLAN networks, losses caused by hidden terminals are often broadly attributed to packet collisions, although such an assumption may trigger Binary Exponential Backoff (BEB) and other issues that may lead to network throughput degradation.

Recent research efforts have been dedicated to enhancing spatial reuse in order to improve network capacity in HD WLANs. Such efforts generally fall into one of three categories: Physical Carrier Sensing (PCS) threshold adaptation, Transmit Power Control (TPC) adaptation and joint PCS and TPC adaptation. PCS adaptation may involve adjusting the transmitter energy level used to determine channel state prior to channel access while TPC adaptation may involve adjusting the actual power emitted onto a channel.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 7 illustrates an example computer program product; and

DETAILED DESCRIPTION

Figure 1A:
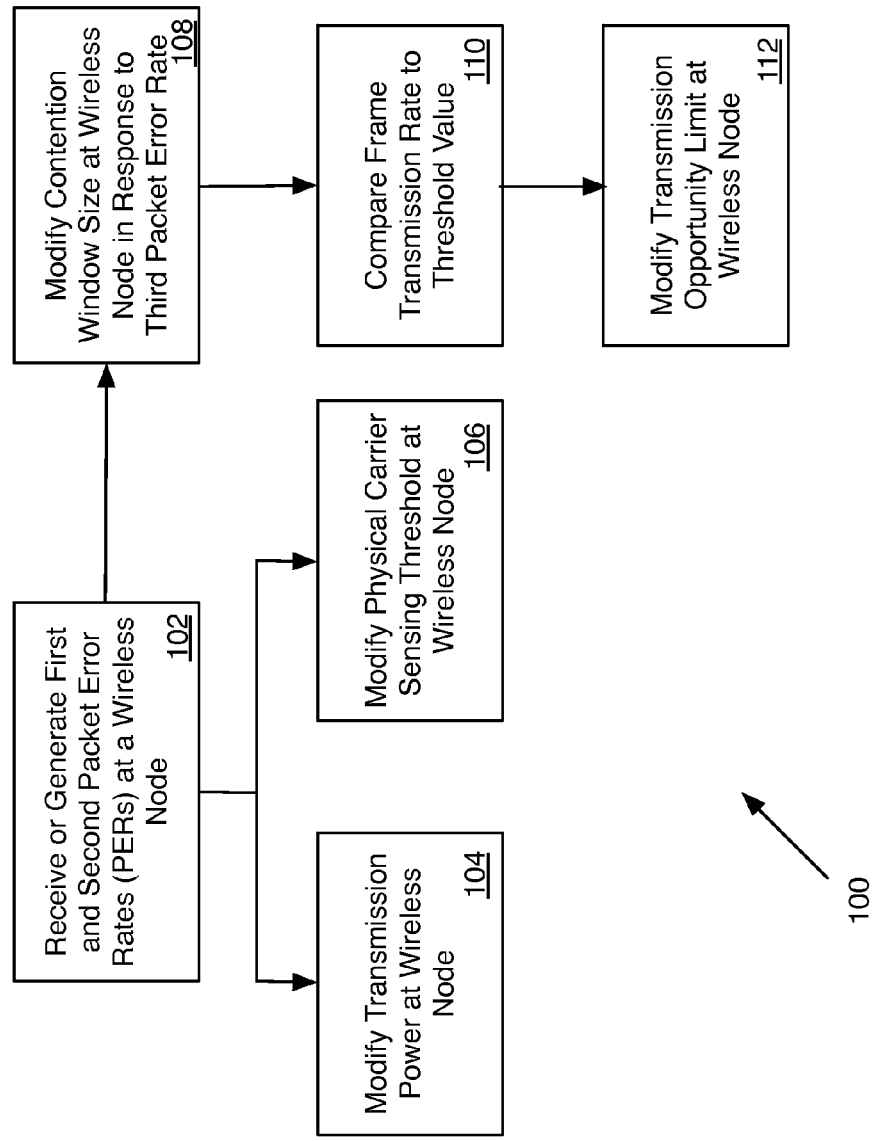
FIG. 1A illustrates an example process for loss differentiation based wireless management.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to the management of communications in a wireless network.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

As used herein the term "node" may refer to any device capable of wirelessly communicating with another device using any combination of hardware, software and/or firmware suitable for undertaking wireless communications in accordance with one or more communications protocols. Thus, the term node as used herein should be broadly understood to encompass servers, clients, Access Points (AP), etc. capable of undertaking wireless communications in accordance with one or more communications protocols. For example, although claimed subject matter is not limited to particular communications protocols, a node as described herein may engage in wireless communications conforming with the Institute for Electrical Electronic Engineers (IEEE)

Standard for Information technology-Telecommunications and information exchange between systems-Local and metropolitan area networks-Specific requirements Part 11: WLAN Media Access Controller (MAC) and Physical Layer (PHY) Specifications, published June 2007, and/or later versions of the standard (the "802.11 standard").

FIG. 1A illustrates an example process 100 for loss differentiation based wireless network management, in accordance with at least some embodiments of the present disclosure. Process 100, and other processes described herein, set forth various functional blocks that may be described as processing steps, functional operations, events and/or acts, etc., and that may be performed by hardware, software or any combination thereof. Those skilled in the art in light of the present disclosure will recognize that numerous alternatives to the functional blocks shown in FIG. 1A may be practiced in accordance with claimed subject matter.

Process 100 may begin, at the start of an update cycle, with the receipt or generation of first and second packet error rates (PERs) at a wireless node in block 102. In some implementations, a wireless node may undertake block 102 by receiving two or more PERs from another wireless node and/or a network controller. In some other implementations, block 102 may involve having a node generate one or more PERs in addition to or instead of having a node receive one or more PERs from other nodes and/or a network controller. In blocks 104 and 106, transmission power (TXPW) and PCS threshold values at a wireless node may be respectively modified in response to at least some of the PERs obtained in block 102. In block 108, a contention window (CW) size at a wireless node may be modified in response to a third packet error rate. In various implementations the third packet error rate of block 106 may be received by a wireless node or may be generated by a wireless node. In block 110 a frame transmission rate may be compared to a threshold value. In some implementations, block 110 may involve determining a number of frames transmitted per second (Tx) by the node. In block 112, a transmission opportunity (TXOP) limit may be modified at a wireless node in response to the comparison undertaken in block 110.

Figure 1B:
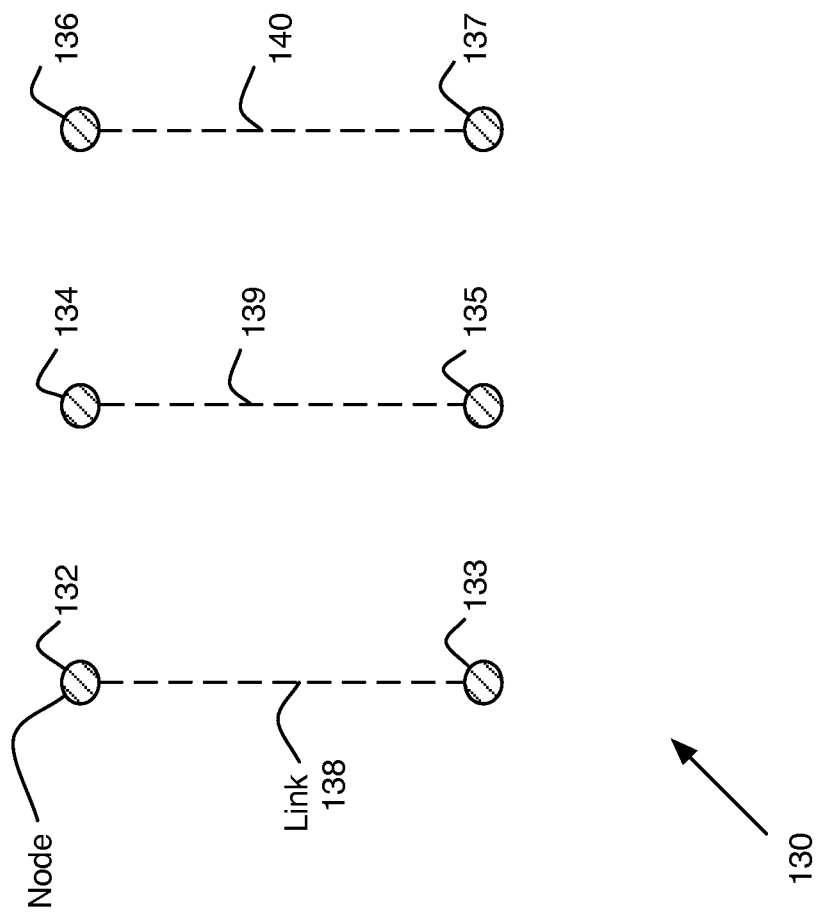
FIG. 1B illustrates a block diagram illustrating an example 3-pair WLAN.

FIG. 1B is a block diagram illustrating an example 3-pair WLAN 130, in accordance with at least some embodiments of the present disclosure. WLAN 130 is presented herein for explanatory purposes to aid in the discussion of FIG. 1A and associated figures and is not meant to limit claimed subject matter in any way. WLAN 130 includes six nodes 132-137 where nodes 132 and 133 form a node pair 132/133 communicatively coupled by link 138 and where corresponding node pairs 134/135 and 136/137 are likewise communicatively coupled by respective links 139 and 140. In WLAN 130, any of nodes 132-137 may seek to communicate, using, for example, communications protocols conforming with the 802.11 standard, with a respective paired node using one of corresponding links 138-140 where that communication takes place over a common communications channel shared by links 138-140. In light of the present disclosure, it is understood that nodes 132 and 133 may be out of both carrier sensing range and interference range of nodes 136 and 137 (and vice versa) while, conversely, nodes 134 and 135 may be in both carrier sensing range and interference range of nodes 132, 133, 136 and 137.

Figure 2:
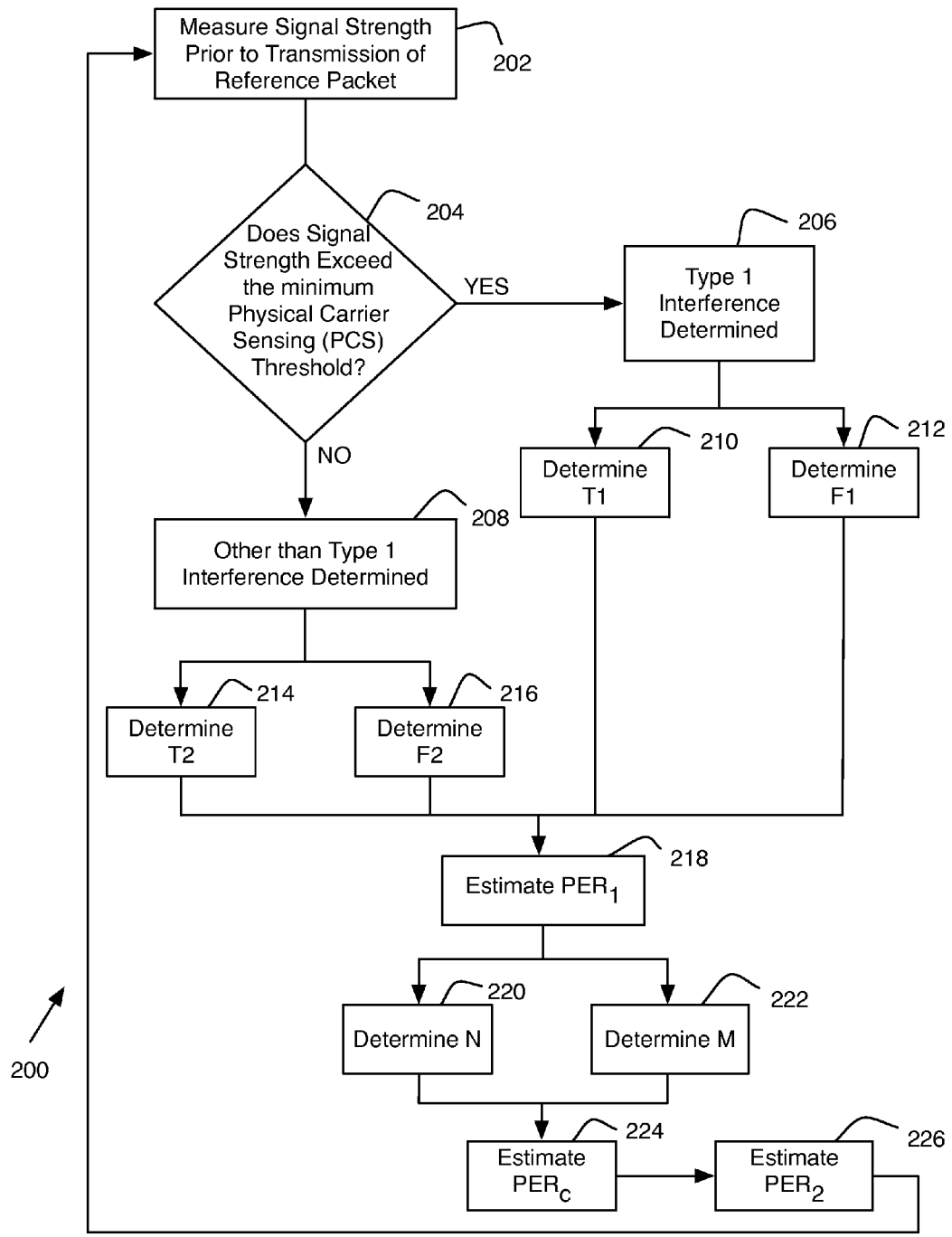
FIG. 2 is a flow chart illustrating an example process for estimating packet error rates (PERs) for or at a node.

FIG. 2 is a flow chart illustrating an example process 200 for generating PERs for or at a wireless node, arranged in accordance with at least some embodiments of the present disclosure. Those skilled in the art in light of the present disclosure will recognize that numerous alternatives to the functional blocks shown in FIG. 2 may be practiced in accordance with claimed subject matter. In some implementations, process 200 may result in a node estimating several types of PER based on different measured and/or estimated quantities. Hence, process 200 may include a node estimating PER caused by an interference signal on a channel where the interference arrives prior to a communications signal. In this disclosure, such interference is denoted "type 1" interference and a PER associated with such type 1 interference and estimated by a node in response to type 1 interference is denoted $PER_1$. Process 200 may also include a node estimating PER caused by an interference signal on a channel where the interference arrives after a communications signal. In this disclosure, such interference is denoted "type 2" interference and a PER associated with type 2 interference and estimated by a node in response to type 2 interference is denoted $PER_2$.

In addition, process 200 may also include a node estimating PER caused by an interference signal on the channel that appears during a same time slot as a communications signal. In this disclosure, such interference is denoted "collision" interference and a PER associated with this type of interference and estimated by a node in response to collision interference is denoted $PER_C$.

In the context of the example network of FIG. 1B, process 200 and the various functional blocks therein to be described below may be undertaken by any one of nodes 132-137. For example, node 132 may estimate $PER_1$ by measuring interference on link 138 resulting from corruption of packets caused by excessive interference signal strength before a reference packet is sent from node 132 to node 133. In addition, node 132 may estimate $PER_2$ resulting from corruption of packets caused by excessive interference signal strength after a reference packet is sent from node 132 to node 133. Further, node 132 may estimate $PER_C$ by determining a number of delayed transmissions it transmits over link 138 and determining a number of failed transmissions over link 138 having an energy level measured in the half slot duration before a transmission that is greater than the PCS threshold.

In some implementations, $PER_1$ and $PER_2$ may be estimated at a node by first having the node measure received signal strength on a communications channel prior to transmitting packets [block 202]. The node may then compare the received signal strength to a minimum PCS threshold value [block 204] and, if the received signal strength exceeds the minimum PCS threshold value then it may be determined that the node is experiencing type 1 interference [block 206]. Conversely, if the received signal strength does not exceed the minimum PCS threshold value then it may be determined that the node is not experiencing type 1 interference [block 208]. In some implementations a minimum PCT threshold may correspond to a physical carrier sensing noise floor.

Having established the presence or absence of type 1 interference, a node may then estimate $PER_1$ and $PER_2$ by counting a number of packets transmitted, T1, and the number of failed packet transmissions, F1, detected in the presence of type 1 interference [blocks 210 and 212 respectively], and counting the number of packets transmitted, T2, and the number of failed packet transmissions, F2, detected in the absence of type 1 interference [blocks 214 and 216 respectively]. $PER_1$ may then be estimated [block 218] from the following expression:

$$PER_1 = 1 - [(1-(F1/T1))/(1-(F2/T2))]$$

$PER_C$ may then be estimated by having the node count the number N of delayed transmissions at the node [block 220] and the number of failed transmissions M having an energy measured in the half slot duration before a transmission that is higher than a PCS threshold value [block 222]. The node may then estimate $PER_C$ [block 224] using the following expression:

$$PER_C = (M/N)*(1/(1-Q))$$

where Q represents the probability of the node delaying a transmission by one half slot. In some implementations Q may have a value of about 0.25 although claimed subject matter is not limited in this regard. Further, in some implementations the estimated $PER_C$ value may represent, but is not limited to, an estimated $PER_C$ value obtained from an exponentially smoothed moving average of $PER_C$ values where the moving average employs a 0.5 smoothing factor.

$PER_2$ may then be estimated [block 226] using $PER_C$ estimated in block 224 and the following expression:

$$PER_2 = (F2/T2) - PER_C$$

Returning to the discussion of FIG. 1A, subsequent to the receipt or generation, in block 102, of packet error rates $PER_1$ and $PER_2$ obtained from, for example, process 200, process 100 may continue, in blocks 104 and 106, with the modification of transmission power (TXPW) and PCS threshold values in response to at least some of the PERs obtained in block 102.

Figure 3:
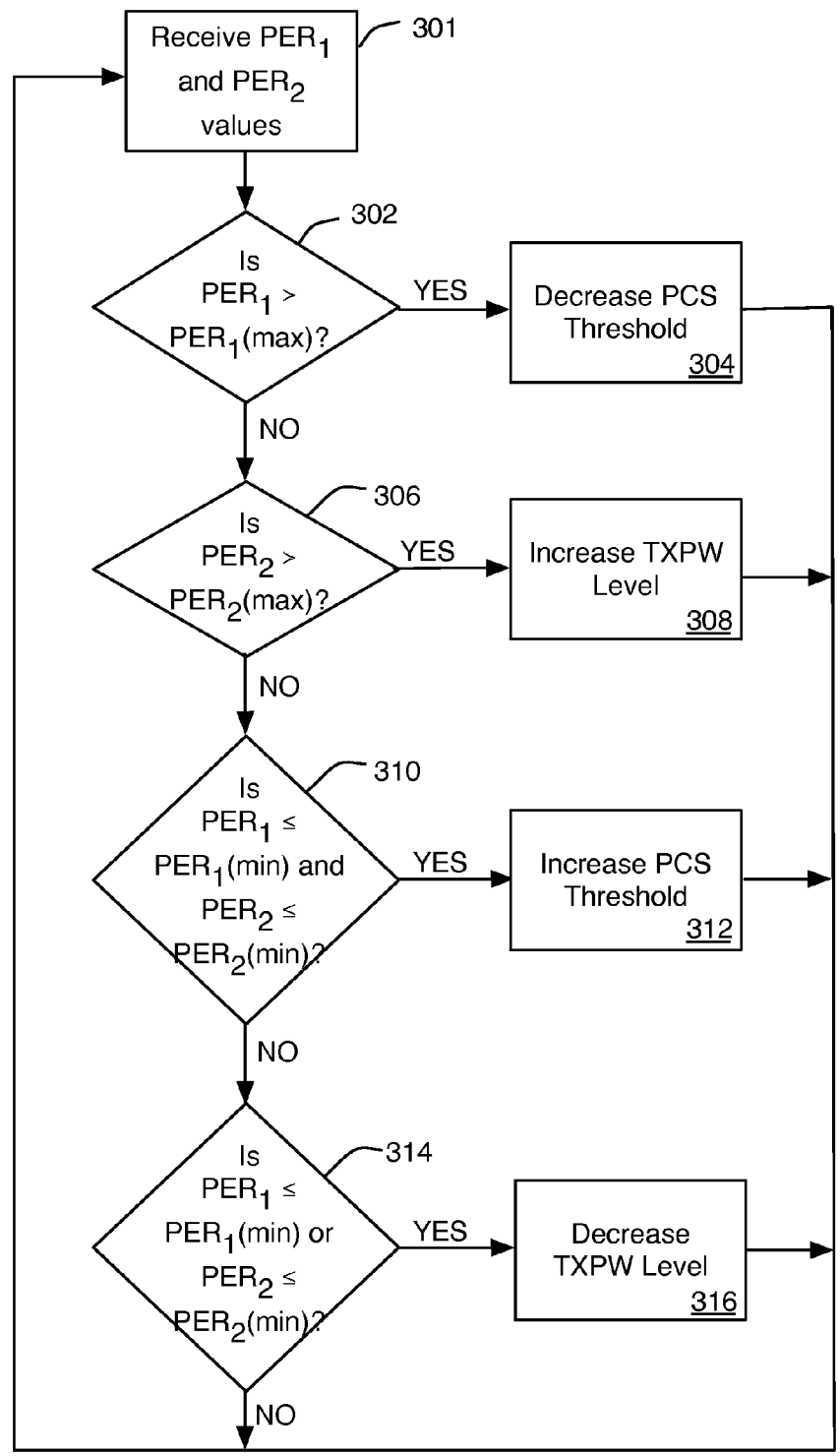
FIG. 3 is a flow chart illustrating another example process for the modification of transmission power (TXPW) and physical carrier sensing (PCS) threshold values in response to one or more of packet error rates (PERs)

FIG. 3 is a flow chart illustrating an example process 300 for the modification of transmission power (TXPW) and PCS threshold values in response to one or more of PERs. Those skilled in the art in light of the present disclosure will recognize that numerous alternatives to the functional blocks shown in FIG. 3 may be practiced in accordance with claimed subject matter.

Process 300 may begin with the receipt of a $PER_1$ value and a $PER_2$ value [block 301]. In some implementations, $PER_1$ and $PER_2$ values may be received in block 301 after having been estimated during process 200 of FIG. 2. Process 300 may then continue with a determination of whether the value of $PER_1$ exceeds a predetermined maximum $PER_1$ value, $PER_1(max)$ [block 302]. If $PER_1$ exceeds $PER_1(max)$ then the node may decrease its PCS threshold value [block 304]. If, on the other hand, $PER_1$ does not exceed $PER_1(max)$ then the node may determine whether the value of $PER_2$ exceeds a predetermined maximum $PER_2$ value, $PER_2(max)$ [block 306]. If $PER_2$ is found to exceed $PER_2(max)$ then the node may increase its TXPW level [block 308].

Process 300 may continue with a determination of whether the value of $PER_1$ is less than or equal to a predetermined minimum $PER_1$ value, $PER_1(min)$, and whether the value of $PER_2$ is less than or equal to a predetermined minimum $PER_2$ value, $PER_2(min)$ [block 310]. If $PER_1$ is less than or equal to $PER_1(min)$ and $PER_2$ is less than or equal to $PER_2(min)$ then the node may increase its PCS threshold value [block 312]. If, on the other hand, $PER_1$ exceeds $PER_1(min)$ or $PER_2$ exceeds $PER_2(min)$, then the node may determine whether the $PER_1$ value is less than or equal to $PER_1(min)$ or whether the $PER_2$ value is less than or equal to $PER_2(min)$ [block 314]. If either $PER_1$ or $PER_2$ is found to be less than or equal to the respective $PER_1(min)$ and $PER_2(min)$ values then the node may decrease its TXPW level [block 316]. Process 300 may then repeat, in a next update cycle, starting with the receipt of a new $PER_1$ and $PER_2$ values at block 301.

In the context of the example network of FIG. 1B, process 300 may be undertaken by any one of nodes 132-137. For example, node 132 may use internal processing logic to compare $PER_1$ to the corresponding predetermined maximum and minimum values and to compare $PER_2$ to the corresponding predetermined maximum and minimum values.

Returning to the discussion of FIG. 1A, process 100 may continue, in block 108, with the modification of contention window (CW) size in response to a third PER.

Figure 4A:
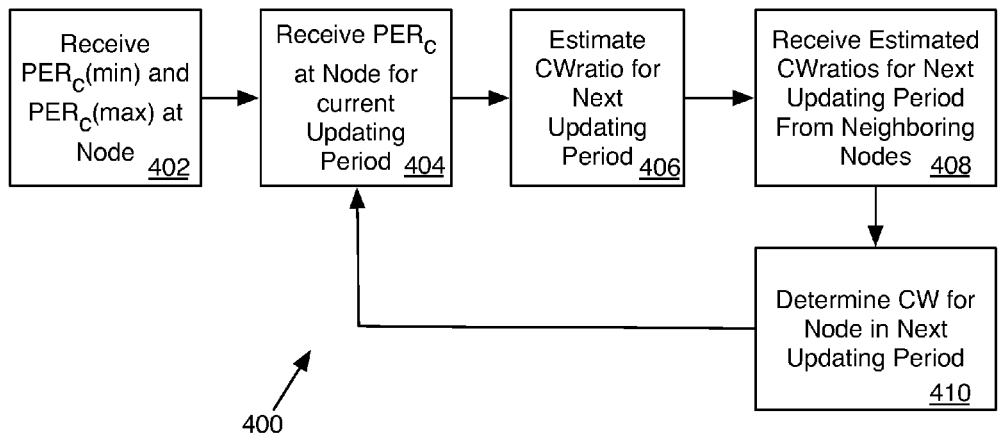
FIGS. 4A and 4B are flow charts illustrating example processes for the modification of contention window (CW) size in response to one or more of packet error rates (PERs)

FIG. 4A is a flow chart illustrating an example process 400 for the modification of CW size in response to one or more of PERs, arranged in accordance with at least some embodiments of the present disclosure. Those skilled in the art in light of the present disclosure will recognize that numerous alternatives to the functional blocks shown in FIG. 4A may be practiced in accordance with claimed subject matter.

Process 400 may begin in block 402 with the receipt, at a node, of collision probability minimum and collision probability maximum values, $PER_C(min)$ and $PER_C(max)$ respectively. For example, although claimed subject matter is not limited in this regard, collision probability minimum and maximum values may be provided to a node in block 402 by a network controller. In block 404 an estimated $PER_C$ value for a current updating period may be obtained from, for example, the results of block 224 of process 200, and may be received at the node. In some implementations, as discussed previously, the estimated $PER_C$ value may represent, but is not limited to, an estimated $PER_C$ value obtained from an exponentially smoothed moving average of $PER_C$ values employing a 0.5 smoothing factor. Further, the node that receives $PER_C(min)$ and $PER_C(max)$ in block 402 may also estimate $PER_C$ using techniques as described above with respect to process 200.

In block 406 the node may estimate a Contention Window ratio (CWratio) for the next updating period. At block 408 the node may receive CWratio values for the next updating period from neighboring nodes and, in block 410, the node's CW size may be determined for the next updating period in response, at least in part, to the node's CWratio estimated in block 406 and the CWratios of the neighboring nodes received in block 408. Process 400 may then repeat, in a next update cycle, with the receipt of a new estimated $PER_C$ value at block 404.

In some implementations, a node's CWratio may represent the ratio of the nodes contention window size (CW) to an estimated number (M) of competing nodes within a carrier sensing range of the node. In some implementations, M, for a given node, may be estimated based on the following relationship:

$$M = \frac{\log\left(1 - \frac{n}{m}\right)}{\log\left(1 - \frac{2}{1+CW}\right)} + 1 \qquad (EQ.\ 1)$$

where n represents the number of slots in which the node does not transmit, and m represents the number of busy slots within the n slots that have an energy level greater than the network's PCS threshold.

In the context of process 400 and referring to the EQ. 1 above, block 410 may involve a node selecting a maximum CWratio from among the CWratio value estimated in block 406 and the CWratio values received from neighboring nodes in block 408. The node may then multiply the maximum CWratio by a value for M (determined, for example, by the node according to a relationship such as EQ. 1) to determine the contention window size for the next updating period in block 410.

Figure 4B:
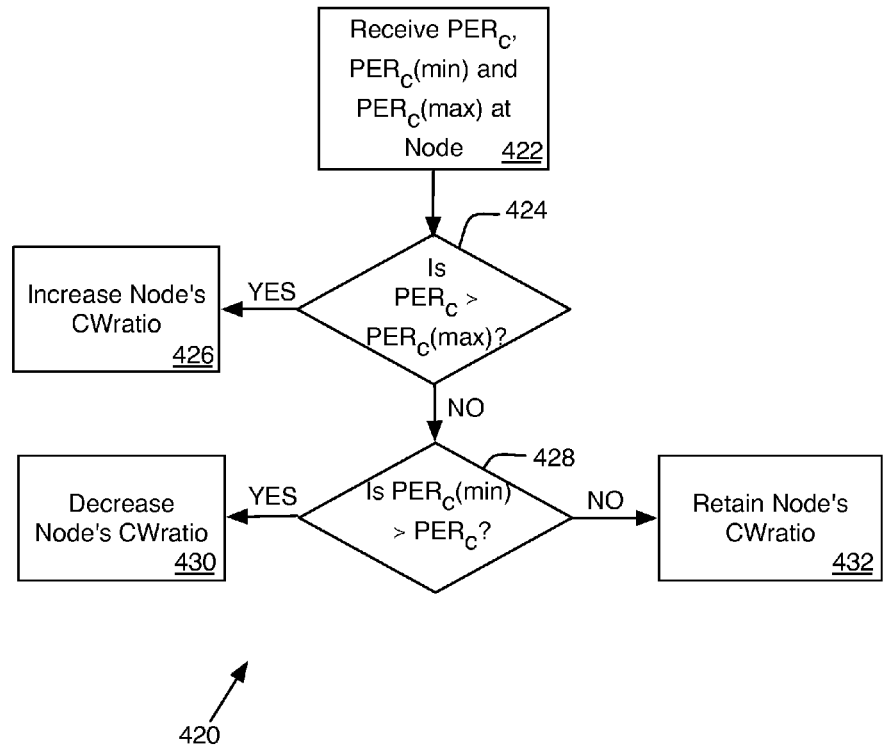

FIG. 4B is a flow chart illustrating an example process 420 for estimating a CWratio, as may be undertaken for block 406 of process 400, arranged in accordance with at least some embodiments of the present disclosure. Those skilled in the art in light of the present disclosure will recognize that numerous alternatives to the functional blocks shown in FIG. 4B may be practiced in accordance with claimed subject matter.

Process 420 may begin with the receipt of $PER_C$, $PER_C$ (min) and $PER_C$(max) values at a node [block 422]. For example, block 422 may be undertaken by performing blocks 402 and 404 of process 400. Process 420 may then continue with a determination of whether the $PER_C$ value exceeds the $PER_C$(min) value [block 424]. If the $PER_C$ value exceeds the $PER_C$(min) value then the node's CWratio value may be increased [block 426]. If, on the other hand, the $PER_C$ value does not exceed the $PER_C$(min) value then a determination may be made of whether the $PER_C$(min) value exceeds the $PER_C$ value [block 428]. If the $PER_C$(min) value exceeds the $PER_C$ value then the node's CWratio value may be decreased [block 430]. If, on the other hand, the $PER_C$(min) value does not exceed the $PER_C$ value then the node's CWratio may be retained or left unchanged [block 432].

In the context of the example network of FIG. 1B, processes 400 and 420 may be undertaken by any one of nodes 132-137. For example, node 132 may receive collision probability minimum and collision probability maximum values from, for example, a network controller (not shown in FIG. 1B), may use, in part, internal processing logic to estimate $PER_C$ using the techniques described above with respect to process 200, may receive CWratio values from neighboring nodes 133-137, and may modify its CW size accordingly as described above.

Returning to the discussion of FIG. 1A, process 100 may continue, in block 112, with the modification of a transmission opportunity (TXOP) limit in response to a comparison in block 110 of a number of frames transmitted per second (Tx) by the node to a threshold value. Those of skill in the art will recognize, in light of the present disclosure, that TXOP may be defined, at least in the context of the 802.11 protocol, as the upper limit to the period of time that a node may undertake successive transmissions under a single channel access.

Figure 5:
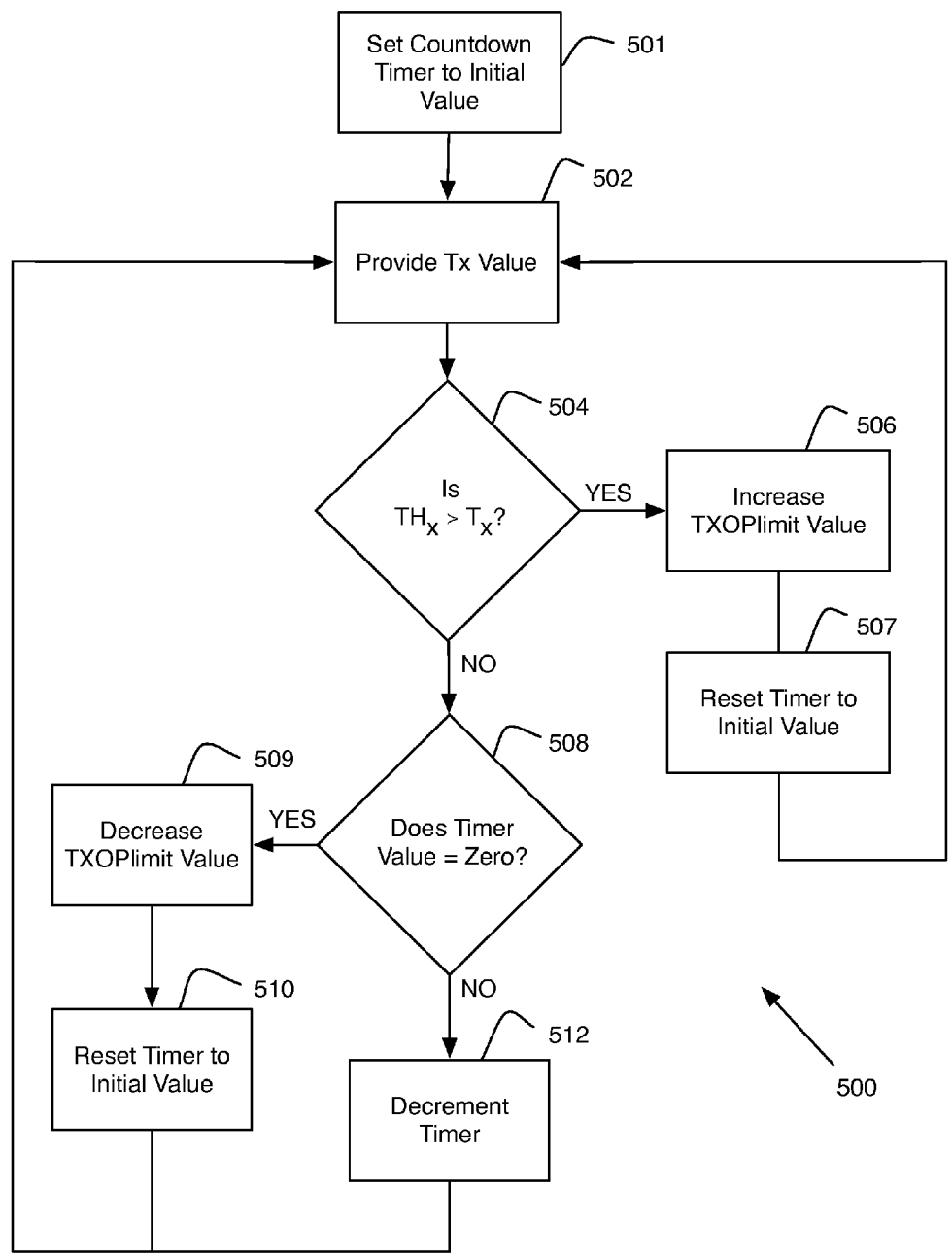
FIG. 5 is a flow chart illustrating an example process for the modification of transmission opportunity (TXOP) limit in response to a number of frames transmitted per second (Tx) by a wireless node.

FIG. 5 is a flow chart illustrating an example process 500 for the modification of a transmission opportunity (TXOP) limit in response to a number of frames transmitted per second (Tx) by a node, in accordance with at least some embodiments of the present disclosure. Those skilled in the art in light of the present disclosure will recognize that numerous alternatives to the functional blocks shown in FIG. 5 may be practiced in accordance with claimed subject matter.

Process 500 may begin in block 501 with the setting of a countdown timer. For example, in some implementations, block 501 may involve setting a timer to an initial value of, for example, five. In block 502 a Tx value may be provided. For example, block 502 may include a node determining a Tx value for the node. In block 504 the node may compare the Tx value to a predetermined Tx value threshold (THx). If the node determines in block 504 that the value of THx exceeds the Tx value received in block 502, then the node may increase its TXOPlimit value [block 506] and may retain or reset the timer at the initial value (e.g., five) [block 507]. Process 500 may then repeat, in a next update cycle, with the receipt of a new Tx value at block 502.

If, on the other hand, the node determines in block 504 that the value of THx does not exceed the Tx value received in block 502, then the node may check the timer value [block 508]. If the timer value is determined to be zero in block 508, then the node may decrease its TXOPlimit value [block 509] and reset the timer value to the initial value [block 510]. Process 500 may then repeat, in a next update cycle, with the receipt of a new Tx value at block 502. If the timer value is determined to be greater than zero in block 508, then the timer value may be decreased [block 512] and process 500 may then repeat, in a next update cycle, with the receipt of a new Tx value at block 502.

In the context of the example network of FIG. 1B, process 500 may be undertaken by any one of nodes 132-137. For example, node 132 may use, in part, internal processing logic to determine its Tx value, compare it to THx and either increase Tx or decrease Tx accordingly as described above.

Process 100 may then repeat, in a next update cycle, beginning with the receipt or generation of new PERs at block 102.

Figure 6:
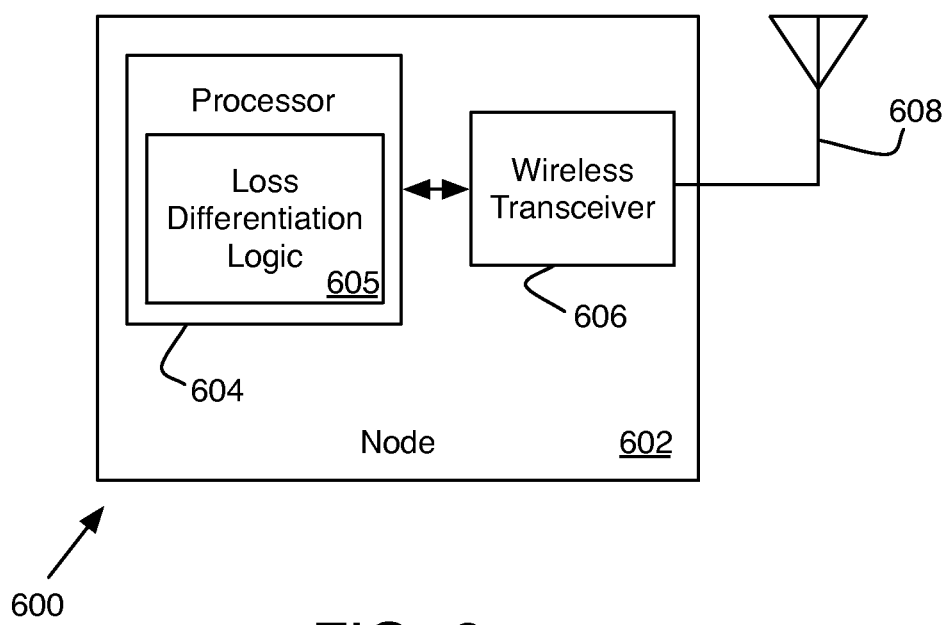
FIG. 6 is a block diagram illustrating an example system for wireless networking.

FIG. 6 is a block diagram illustrating an example system 600 for wireless networking in accordance with at least some embodiments of the present disclosure. System 600 may be used to perform some or all of the various functions discussed above in connection with FIGS. 1A and 2-5. System 600 may include any device or collection of devices capable of undertaking wireless communications in a network. For example, system 600 may include selected components of a mobile platform such as a mobile computer, a sensor node of a sensor network, etc., although claimed subject matter is not limited in this regard. In the context of the example network of FIG. 1B, system 600 may represent any one of nodes 132-137.

System 600 includes a node 602 having a processor 604, an RF transceiver 606 and an antenna 608. Node 602 may include additional items such as memory, a router, network interface logic, etc. that have not been shown in FIG. 6 in order to avoid obscuring claimed subject matter. Processor 604 may include loss differentiation logic 605 configured to provide the functionality described herein and claimed subject matter is not limited to specific types or manifestations of processing logic. For example, processor 604 may be a microprocessor or Central Processing Unit (CPU). In other implementations, processor 304 may be an Application Specific Integrated Circuit (ASIC), a Field Programmable Gate Array (FPGA), a digital signal processor (DSP), or other integrated formats. Further, antenna 608 may be any suitable antenna including but not limited to dish, parabolic, panel, sector, directional, omnidirectional, etc. Also, while an RF transceiver 606 is illustrated in FIG. 6, claimed subject matter is not limited in this regard and node 602 may, for example, employ discrete RF receiver and RF transmitter circuitry.

FIG. 7 illustrates an example computer program product 700. Program product 700 includes a signal bearing medium 702. Signal bearing medium 702 includes one or more instructions 704 that, when executed by, for example, a processor, may provide the functionality described above with respect to FIGS. 1A and 2-5. Thus, for example, referring to the system of FIG. 6, processor 604 may undertake one or more of the blocks shown in FIGS. 1A and 2-5 in response to instructions 604 conveyed by medium 602.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, referring to the system of FIG. 6, program product 700 may be wirelessly conveyed to processor 604 (via antenna 608 and wireless transceiver 606) by an RF signal bearing medium 702, where the signal bearing medium 702 is conveyed to system 600 by a wireless communications medium 710 (e.g., an wireless communications medium conforming with the 802.11 standard).

Figure 8:
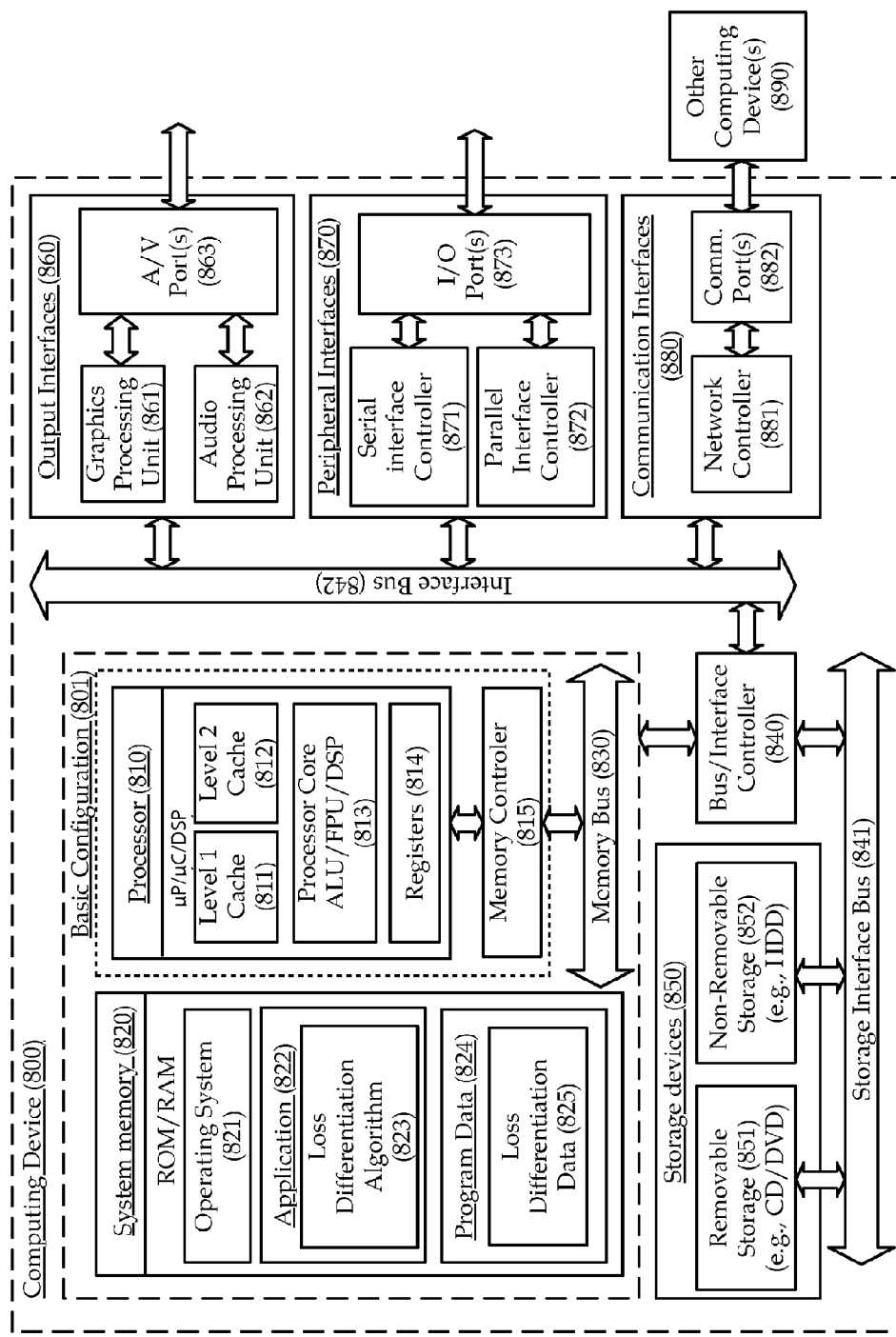
FIG. 8 is a block diagram illustrating an example computing device that is arranged for loss differentiation based management of a WLAN, all arranged in accordance with at least some embodiments of the present disclosure.

FIG. 8 is a block diagram illustrating an example computing device 800 that is arranged for loss differentiation based management of a WLAN in accordance with the present disclosure. In a very basic configuration 801, computing device 800 typically includes one or more processors 810 and system memory 820. A memory bus 830 can be used for communicating between the processor 810 and the system memory 820.

Depending on the desired configuration, processor 810 can be of any type including but not limited to a microprocessor (µP), a microcontroller (µC), a digital signal processor (DSP), or any combination thereof. Processor 810 can include one or more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 typically includes an operating system 821, one or more applications 822, and program data 824. Application 822 includes a loss differentiation based management algorithm 823 that is arranged to perform the functions as described herein including the functional blocks described with respect to processes FIGS. 1A and 2-5. Program Data 824 includes loss differentiation based management data 825, for example, estimated PERs etc, that is useful for implementing loss differentiation based management algorithm 823. In some example embodiments, application 822 can be arranged to operate with program data 824 on an operating system 821 such that implementations of loss differentiation based management may be provided as described herein. This described basic configuration is illustrated in FIG. 8 by those components within dashed line 801.

Computing device 800 can have additional features or functionality, and additional interfaces to facilitate communications between the basic configuration 801 and any required devices and interfaces. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include an interface bus 842 for facilitating communication from various interface devices (e.g., output interfaces, peripheral interfaces, and communication interfaces) to the basic configuration 801 via the bus/interface controller 840. Example output interfaces 860 include a graphics processing unit 861 and an audio processing unit 862, which can be configured to communicate to various external devices such as a display or speakers via one or more A/V ports 863. Example peripheral interfaces 870 include a serial interface controller 871 or a parallel interface controller 872, which can be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which can be arranged to facilitate communications with one or more other computing devices 890 over a network communication via one or more communication ports 882. A communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 800 can also be implemented as a personal computer including both laptop computer and non-laptop computer configurations.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed:

1. A method for managing nodes in a wireless network, comprising:
   providing a first, second, and third packet error rates at a wireless node, wherein:
     the first packet error rate comprises an indication of an interference signal on a channel prior to a communication,
     the first packet error rate is generated by:
       counting T1, the number of packets transmitted in the presence of type 1 interference,
       counting F1, the number of packet transmissions that failed in the presence of type 1 interference,
       counting T2, the number of packets transmitted in the absence of type 1 interference,
       counting F2, the number of packet transmissions that failed in the absence of type 1 interference, and
       calculating the first packet error rate from T1, F1, T2 and F2,
     the second packet error rate comprises an indication of an interference signal on the channel after the communication, and
     the third packet error rate comprises an indication of an interference signal on the channel during the communication;
   modifying a transmission power level at the wireless node in response to the first and the second packet error rates;
   modifying a carrier sensing threshold at the wireless node in response to the first and the second packet error rates; and
   modifying a contention window ratio at the wireless node in response to the third packet error rate, wherein the modifying the contention window ratio comprises:
     estimating the contention window ratio at the wireless node by increasing the contention window ratio if the third packet error rate exceeds a maximum third packet error rate value,
     receiving one or more contention window ratios from one or more neighboring wireless nodes, and
     selecting a maximum contention window ratio from among the estimated contention window ratio and the received one or more contention window ratio values.

2. The method of claim 1, wherein:
the providing the first and second packet error rates comprises receiving the first and second packet error rates at the wireless node.

3. The method of claim 1, wherein:
the providing the first and second packet error rates comprises generating the first and second packet error rates at the wireless node.

4. The method of claim 3, wherein:
providing a first, second, and third packet error rates at a wireless node comprises:
   generating the first packet error rate ($PER_1$) by:
     calculating $PER_1$ from the following expression:

$$PER_1 = 1 - \frac{1 - \frac{F_1}{T_1}}{1 - \frac{F_2}{T_2}}; \text{ and}$$

providing the third packet error rate ($PER_C$) by:
     counting N, the number of delayed transmissions,
     counting M, the number of failed transmissions having an energy measured in the half slot duration before a transmission that is higher than a PCS threshold value,
     providing Q, the probability of the node delaying a transmission by one half slot, and
     calculating $PER_C$ from the following expression:

$$PER_C = \frac{M}{N} \cdot \frac{1}{1-Q}; \text{ and}$$

generating the second packet error rate ($PER_2$) by:

$$PER_2 = \frac{F2}{T2} - PER_C.$$

5. The method of claim 4, wherein:
PER$_C$ is further calculated by employing an exponentially smoothed moving average of PER$_C$.

6. The method of claim 1, wherein the first packet error rate arrives prior to a communications signal arriving on the channel, and wherein that the second packet error rate arrives after the communications signal arrives on the channel.

7. The method of claim 1, wherein the modifying the carrier sensing threshold comprises decreasing the carrier sensing threshold if the first packet error rate exceeds a first threshold value.

8. The method of claim 7, wherein the modifying the carrier sensing threshold comprises increasing the carrier sensing threshold if the first packet error rate is less than or equal to the first threshold value and if the second packet error rate is less than or equal to a second threshold value.

9. The method of claim 8, wherein the modifying the transmission power level comprises increasing the transmission power level if the second packet error rate exceeds the second threshold value.

10. The method of claim 9, wherein the modifying the transmission power level comprises decreasing the transmission power level if the first packet error rate is less than or equal to the first threshold value or if the second packet error rate is less than or equal to the second threshold value.

11. The method of claim 1, wherein the modifying the contention window ratio comprises decreasing the contention window ratio if a minimum third packet error rate value exceeds the third packet error rate.

12. The method of claim 1, further comprising:
comparing a frame transmission rate to a threshold value; and
modifying a transmission opportunity (TXOP) limit at the wireless node in response to the comparison.

13. The method of claim 12, wherein the modifying the transmission opportunity (TXOP) limit comprises decreasing the frame transmission rate until the threshold value equals or exceeds the frame transmission rate.

14. The method of claim 12, wherein the modifying the transmission opportunity (TXOP) limit comprises increasing the frame transmission rate until the frame transmission rate equals or exceeds the threshold value.

15. An article comprising: a computer program product comprising a non-transitory storage medium having stored therein instructions that, if executed, result in:
providing a first, second, and third packet error rates at a wireless node, wherein:
the first packet error rate comprises an indication of an interference signal on a channel prior to a communication,
the first packet error rate is generated by:
counting T1, the number of packets transmitted in the presence of type 1 interference,
counting F1, the number of packet transmissions that failed in the presence of type 1 interference,
counting T2, the number of packets transmitted in the absence of type 1 interference,
counting F2, the number of packet transmissions that failed in the absence of type 1 interference, and
calculating the first packet error rate from T1, F1, T2 and F2,
the second packet error rate comprises an indication of an interference signal on the channel after the communication, and
the third packet error rate comprises an indication of an interference signal on the channel during the communication;
modifying a transmission power level at the wireless node in response to the first and the second packet error rates;
modifying a carrier sensing threshold at the wireless node in response to the first and the second packet error rates; and
modifying a contention window ratio at the wireless node in response to the third packet error rate, wherein the modifying the contention window ratio comprises:
estimating the contention window ratio at the wireless node by increasing the contention window ratio if the third packet error rate exceeds a maximum third packet error rate value,
receiving one or more contention window ratios from one or more neighboring wireless nodes, and
selecting a maximum contention window ratio from among the estimated contention window ratio and the received one or more contention window ratio values.

16. The article of claim 15, the non-transitory storage medium having stored therein instructions that, if executed, further result in:
providing the first and second packet error rates by generating the first and second packet error rates at the wireless node.

17. The article of claim 16, the non-transitory storage medium having stored therein instructions that, if executed, further result in:
generating the first packet error rate ($PER_1$) by:
calculating $PER_1$ from the following expression:

$$PER_1 = 1 - \frac{1 - \frac{F_1}{T_1}}{1 - \frac{F_2}{T_2}}; \text{ and}$$

providing the third packet error rate ($PER_C$) by:
counting N, the number of delayed transmissions,
counting M, the number of failed transmissions having an energy measured in the half slot duration before a transmission that is higher than a PCS threshold value,
providing Q, the probability of the node delaying a transmission by one half slot, and
calculating $PER_C$ from the following expression:

$$PER_C = \frac{M}{N} \cdot \frac{1}{1-Q}; \text{ and}$$

generating the second packet error rate ($PER_2$) by:

$$PER_2 = \frac{F2}{T2} - PER_C.$$

18. The article of claim 17, the non-transitory storage medium having stored therein instructions that, if executed, further result in:

$PER_C$ being further calculated by employing an exponentially smoothed moving average of $PER_C$.

19. The article of claim 15, wherein the first packet error rate arrives prior to a communications signal arriving on the channel, and wherein that the second packet error rate arrives after the communications signal arrives on the channel.

20. The article of claim 15, the non-transitory storage medium having stored therein instructions that, if executed, further result in:

comparing a frame transmission rate to a threshold value; and modifying a transmission opportunity (TXOP) limit at the wireless node in response to the comparison.

21. A wireless communications node, comprising:
a processor configured to:
provide a first, second, and third packet error rates at the wireless communication node; wherein:
  the first packet error rate comprises an indication of an interference signal on a channel prior to a communication,
  the first packet error rate is generated by:
    counting T1, the number of packets transmitted in the presence of type 1 interference,
    counting F1, the number of packet transmissions that failed in the presence of type 1 interference,
    counting T2, the number of packets transmitted in the absence of type 1 interference,
    counting F2, the number of packet transmissions that failed in the absence of type 1 interference, and
    calculating the first packet error rate from T1, F1, T2 and F2,
  the second packet error rate comprises an indication of an interference signal on the channel after the communication, and
  the third packet error rate comprises an indication of an interference signal on the channel during the communication;
modify a transmission power level in response to the first and the second packet error rates;
modify a carrier sensing threshold in response to the first and the second packet error rates; and
modify a contention window ratio in response to the third packet error rate, wherein the modifying the contention window ratio comprises:
  estimating the content window ratio by increasing the contention window ratio if the third packet error rate exceeds a maximum third packet error rate value,
  receiving one or more contention window ratios from one or more neighboring wireless nodes, and
  selecting a maximum contention window ratio from among the estimated contention window ratio and the received one or more contention window ratio values.

22. The node of claim 21, wherein the processing logic is further configured to:
provide the first and second packet error rates by generating the first and second packet error rates.

23. The node of claim 22, wherein the processing logic is further configured to:
generate the first packet error rate ($PER_1$) by:
  calculating $PER_1$ from the following expression:

$$PER_1 = 1 - \frac{1 - \frac{F_1}{T_1}}{1 - \frac{F_2}{T_2}}; \text{ and}$$

provide the third packet error rate ($PER_C$) by:
  counting N, the number of delayed transmissions,
  counting M, the number of failed transmissions having an energy measured in the half slot duration before a transmission that is higher than a PCS threshold value,
  providing Q, the probability of the node delaying a transmission by one half slot, and
  calculating $PER_C$ from the following expression:

$$PER_C = \frac{M}{N} \cdot \frac{1}{1-Q}; \text{ and}$$

generate the second packet error rate ($PER_2$) by:

$$PER_2 = \frac{F2}{T2} - PER_C.$$

24. The node of claim 23, wherein the processing logic is further configured to:
further calculate $PER_C$ by employing an exponentially smoothed moving average of $PER_C$.

25. The node of claim 21, wherein the first packet error rate arrives prior to a communications signal arriving on the channel, and
wherein that the second packet error rate arrives after the communications signal arrives on the channel.

26. The node of claim 21, wherein the processing logic is further configured to:
compare a frame transmission rate to a threshold value; and
modify a transmission opportunity (TXOP) limit in response to the comparison.

* * * * *